United States Patent [19]

Dimolitsas et al.

[11] Patent Number: 5,515,178
[45] Date of Patent: May 7, 1996

[54] LINE STATE TRANSMISSION SYSTEM OVER DIGITAL CHANNELS FOR GROUP 3 FACSIMILE

[75] Inventors: Spiros Dimolitsas, Gaithersburg; Michael Onufry, Jr., Clarksburg; Jack H. Rieser, Middletown, all of Md.

[73] Assignee: Comsat Corporation, Bethesda, Md.

[21] Appl. No.: 414,132

[22] Filed: Mar. 30, 1995

Related U.S. Application Data

[63] Continuation of Ser. No. 754,785, Sep. 4, 1991, abandoned.

[51] Int. Cl.$^6$ ........................................ H04N 1/40
[52] U.S. Cl. ........................ 358/445; 358/438; 379/100
[58] Field of Search ........................ 358/407, 432, 358/434, 438, 443, 445; 379/94, 100, 386, 106, 104; 371/69.1, 49.1

[56] References Cited

U.S. PATENT DOCUMENTS

| | | | |
|---|---|---|---|
| 3,873,977 | 3/1975 | McIntosh | 341/55 |
| 4,558,369 | 12/1985 | Shinohara et al. | 358/257 |
| 4,606,028 | 8/1986 | Wagenmakers | 371/49.1 |
| 4,635,255 | 1/1987 | Clark et al. | 370/110.1 |
| 4,771,335 | 9/1988 | Obara | 358/258 |
| 4,809,297 | 2/1989 | Polansky et al. | 375/7 |
| 4,817,087 | 3/1989 | Yamada | 370/85 |
| 4,841,299 | 6/1989 | Weaver | 341/63 |
| 4,855,995 | 8/1989 | Hiyama et al. | 370/86 |
| 4,894,823 | 1/1990 | Adelmann et al. | 370/60 |
| 4,894,843 | 1/1990 | Yoshida et al. | 375/8 |
| 4,897,835 | 1/1990 | Gaskill et al. | 370/94.1 |
| 4,916,691 | 4/1990 | Goodman | 370/60 |
| 4,918,718 | 4/1990 | Emmons et al. | 379/53 |
| 4,939,735 | 7/1990 | Fredericks et al. | 371/69.1 |
| 4,970,723 | 11/1990 | Lin | 379/110.1 |
| 5,049,880 | 9/1991 | Stevens | 341/63 |
| 5,050,005 | 9/1991 | Kagami | 358/434 |
| 5,119,092 | 6/1992 | Sumi et al. | 341/63 |
| 5,142,568 | 8/1992 | Ogata et al. | 379/100 |

*Primary Examiner*—Leo Boudreau
*Assistant Examiner*—Rafael Bacares
*Attorney, Agent, or Firm*—Sughrue, Mion, Zinn, Macpeak & Seas

[57] ABSTRACT

A facsimile communication system including a first processing circuit, connected to receive a facsimile signal from a first facsimile device, for converting the analog voiceband facsimile signal into a digital code signal representing information carried in the analog voiceband signal, and for transmitting the digital code signal; a second processing circuit, connected to receive the transmitted digital code signal from the first processing circuit, for converting the received digital code signal into an analog voiceband facsimile signal; and a second facsimile device, connected to receive the analog voiceband facsimile signal from the second processing circuit. The digital code signal includes a digital code which is repeated in the digital code signal an integral number of times. In another embodiment, the digital code signal contains another binary code which represents the position, within a data field, when information was first detected by the first processing circuit.

22 Claims, 6 Drawing Sheets

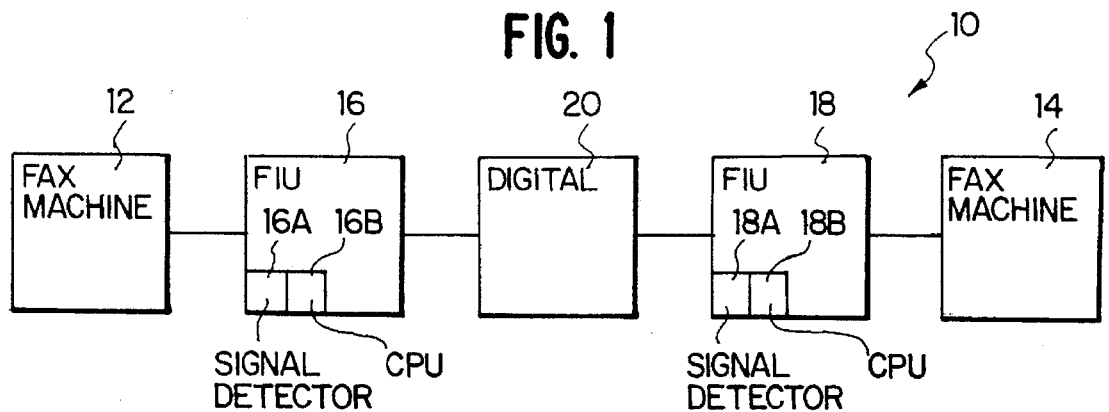
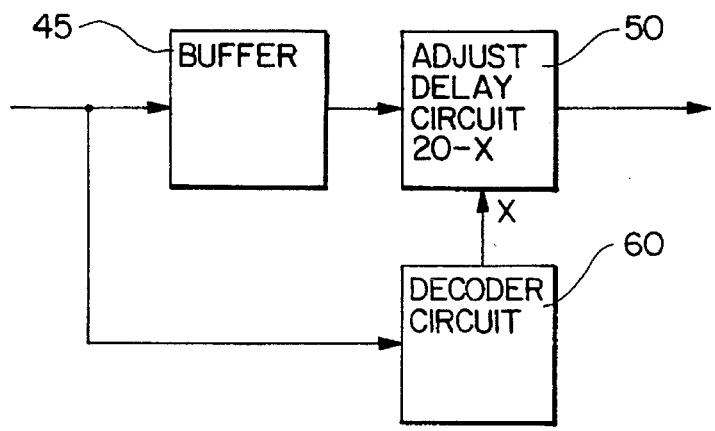
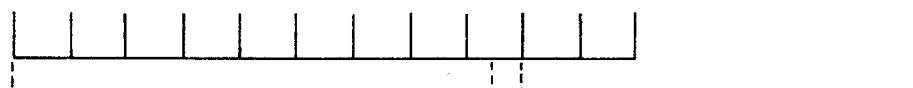
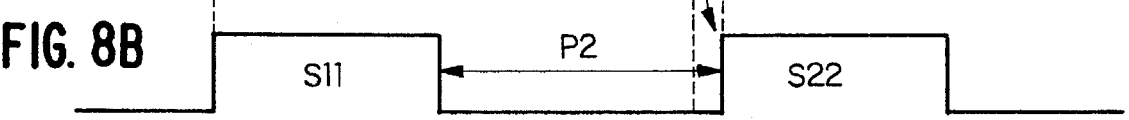
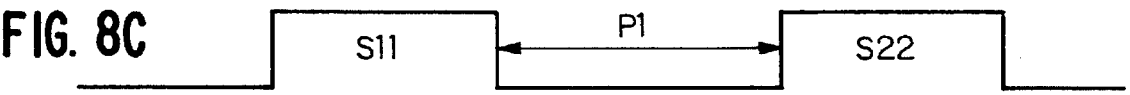

LINE STATE TRANSMISSION SYSTEM OVER DIGITAL CHANNELS FOR GROUP 3 FACSIMILE

This is a Continuation of application Ser. No. 07/754,785 filed Sep. 4, 1991 now abandoned.

FIELD OF THE INVENTION

The present invention relates to a system for transmitting line-state information over digital channels in group 3 facsimile communications without the need for additional out-of-band transmission capacity.

BACKGROUND OF THE INVENTION

The demodulation of group 3 facsimile signals and transmission over digital channels in the baseband offers substantial transmission gain and transmission quality enhancement advantages.

Improvements in transmission quality with group 3 facsimile signals transmitted over digital channels in the baseband result because of the shorter analog links requiring equalization. This assumes that the FIUs are placed in the vicinity of the user facsimile machines, and that a relatively error free digital link is available.

Transmission gain benefits are realized when group 3 facsimile signals are transmitted in the baseband since the user information need only occupy 9.6 kbit/s worth of transmission capacity, as opposed to, for example, the 40 kbit/s worth of transmission capacity that would be necessary if ADPCM links (according to the 1988 Blue Book, CCITT Recommendation G.723) were used. When 64 kbit/s PCM links according to CCITT Recommendation G.711 are employed, the transmission gains are even more substantial. However, in addition to user originated data, line state transitions also need to be transmitted over the digital links. This requires the allocation of substantial additional transmission capacity (e.g., 10% of the capacity allocated for the transmission of user-data information) if an out-of-band approach is pursued.

For example, U.S. application Ser. No. 07/720,990 filed on Jun. 26, 1991 by the present inventors describes a communication system in which demodulated facsimile messages are transmitted over a digital transmission channel in a digital frame comprising 35 bits and appearing every 3.33 ms. Of these 35 bits, 32 bits are available for carrying the actual message, with the remaining 3 bits being set aside to carry information concerning the type of traffic (called "line state information") in the 32-bit message. These 3 bits are referred to as line control bits. With this scheme, the digital frame is transmitted at a rate of 10.5 kbits/sec, whereas the transmission rate of the actual message (i.e., 32 bits) is 9.6 kbit/s. Accordingly, this 35-bit digital frame is an example of an out-of-band approach which requires additional transmission capacity.

U.S. Pat. No. 4,771,335 to Obara discloses a communication system which includes two digital terminal stations, a digital communication line for connecting the two digital terminal stations, and two analog communication lines for connecting two facsimile devices to the two digital terminal stations, respectively. Each of the digital terminal stations includes a High-Level Data link Control (HDLC) unit which serves to assemble data into a digital packet and to disassemble digital packets received from the other digital terminal station. The method of assemblage and disassembly is based on the X.25 standard, established by the CCITT. According to this standard, a series of data is divided into several blocks each composed of a designated number of words, e.g., 256 octets. Control information, called a header, which is necessary to transfer the data is added to each block of data. The control information includes the address information and frame error check sequence information. According to the Obara system, the control information also includes an identifier which identifies the type of data. Thus, similar to the U.S. Application discussed above, the Obara system sets aside a portion of the transmitted data to carry information concerning the type of traffic being transmitted.

The following are further examples of data communication systems:

U.S. Pat. No. 4,897,835 discloses a paging communication system for transmitting data packets including system control packets and message packets to several receivers each having an address.

U.S. Pat. Nos. 4,817,087, 4,916,691 and 4,918,718 disclose packet assemble and disassemble circuitry.

U.S. Pat. No. 4,809,297 discloses an interface device for connection between a facsimile machine and a radio transceiver.

U.S. Pat. No. 4,894,843 discloses a data communication system including a control circuit which generates procedure signals in accordance with CCITT recommendations.

U.S. Pat. No. 4,855,995 discloses a data communication system including a device for generating a frame having several channels, and at least one of the channels includes a region for data information and a region for indicating the validity of the data region.

SUMMARY OF THE INVENTION

It is an object of the invention to provide a facsimile communication system which permits line state information to be transmitted in-band together with user-data without the need for additional out-of-band transmission capacity.

It is another object of the invention to provide a facsimile communication system in which facsimile signals are transmitted with high temporal resolution.

These and other objects are accomplished according to the present invention which provides two embodiments for transmitting line-state (LS) information over a digital baseband channel.

The two embodiments of the invention are used in conjunction with a facsimile interface unit (FIU) in the voiceband link whose function is to intercept and demodulate the facsimile signals and, once demodulated, to transmit these signals in digital form over a digital baseband channel. At the other end of the digital link another FIU receives the digital baseband signals and converts them to the analog voiceband domain by selection of a suitable modulator.

Not all signals need to be transmitted over the digital channel. In particular, signals used for link equalization (e.g., training and synchronization) can be regenerated by the modulating FIU when signalled to do so by the demodulating FIU. To permit the selection of a suitable modulator and/or the precise timing for the regeneration of link equalizing signals, the demodulating FIU must generate appropriate control signals and transmit these control signals to the modulating FIU in order to convey the line state (LS) changes and their corresponding timing relationships. It is important for the modulating FIU to know when to regenerate the control signals because incorrect timing of the signals could result in violation of the group 3 facsimile protocol timing jitter tolerances.

Further, since the transmission link is digital, additional information needs to be conveyed to the modulating FIU to indicate the type of modulation required for the regeneration of the link equalizing signal and for the remodulation of user data signals. To accomplish these functions the demodulating FIU must generate appropriate control signals that convey the relevant line state (LS) changes and transmit them to the modulating FIU.

The present invention provides two embodiments each of which permits LS information to be transmitted over the digital channel.

The first embodiment is applicable to any channel that is continuously available and is insensitive to any partitioning of the channel imposed by system constraints. According to the first embodiment the facsimile communication system includes:

a first facsimile device for providing an analog voiceband facsimile signal;

a first processing circuit, connected to receive the facsimile signal from the first facsimile device, for converting the analog voiceband facsimile signal into a digital code signal representing information carried in the analog voiceband signal, and for transmitting the digital code signal;

a second processing circuit, connected to receive the transmitted digital code signal from the first processing circuit, for converting the received digital code signal into an analog voiceband facsimile signal; and a second facsimile device, connected to receive the analog voiceband facsimile signal from the second processing circuit;

the digital code signal including a first code which is repeated in the digital code signal an integral number of times.

The second embodiment of the invention relaxes the requirement that transmission capacity is always uniformly available for facsimile user data. Specifically, the second embodiment recognizes the fact that some channel capacity within the digital channel may be pre-allocated on an intermittent basis for other system functions and therefore the insertion of new user-data may not be possible at the frequency required to avoid unacceptable timing jitter at the receiving Facsimile Terminal Equipment (FTE). According to the second embodiment, the digital code signal transmitted from the first processing circuit includes a second code which represents a position within a data field when the analog voiceband signal is received by the first processing circuit. This position information is utilized by the second (receiving) processing circuit to effect appropriate timing adjustments.

BRIEF DESCRIPTION OF THE DRAWINGS

FIG. 1 is a block diagram showing the communication system according to the invention.

FIG. 7 is a block diagram of the modulating Facsimile Interface Unit according to the second embodiment of the invention.

FIGS. 8A–8C are timing diagrams showing an example of timing adjustment according to the second embodiment of the invention.

DESCRIPTION OF THE PREFERRED EMBODIMENTS

Figure 2:
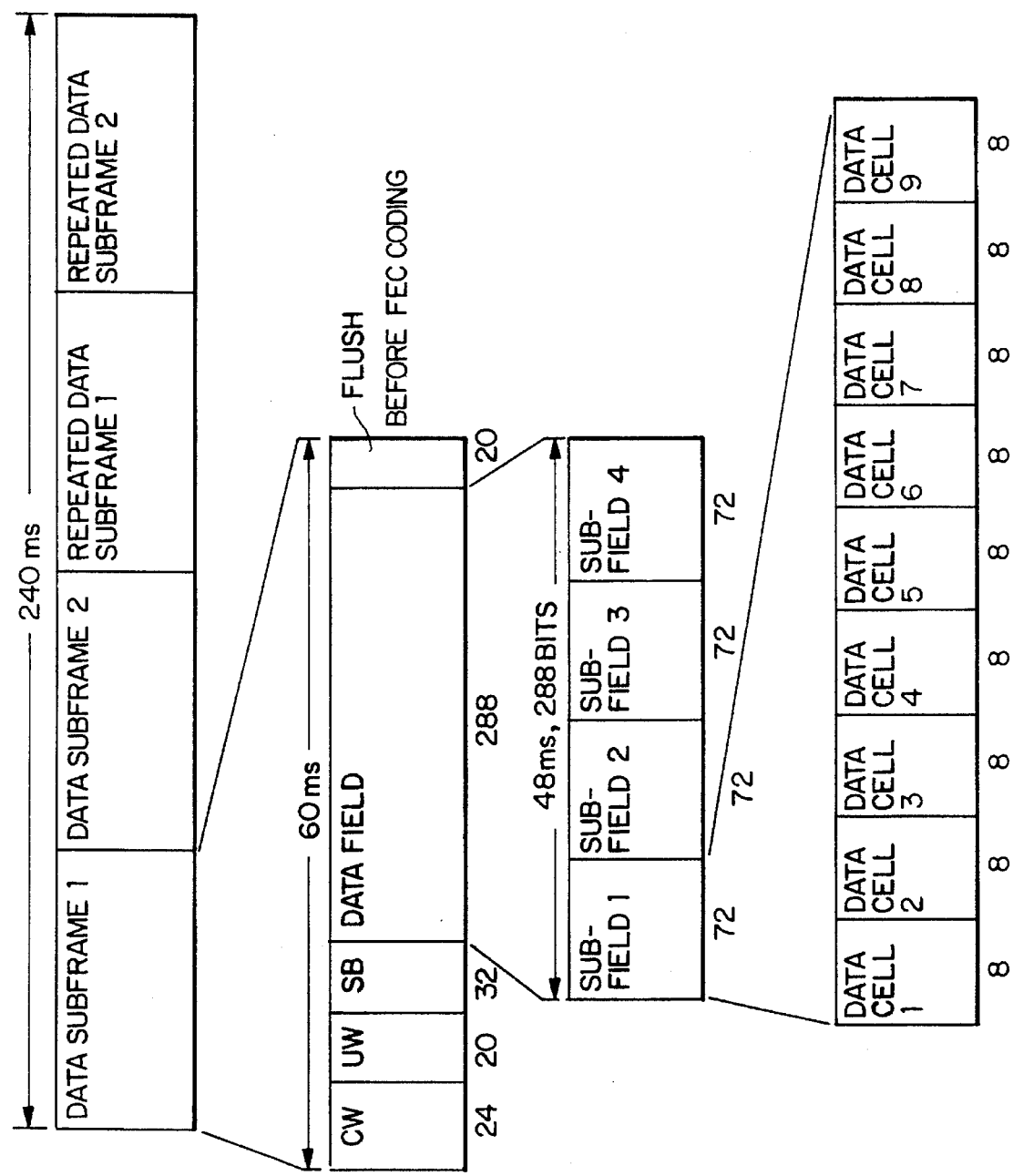
FIG. 2 shows an example of a baseband digital channel according to the first embodiment of the invention.

FIG. 1 shows a communication system of the type described in the above-mentioned U.S. application and which is applicable to the present invention. As shown in FIG. 1, the communication system 10 includes two facsimile machines 12 and 14, two Facsimile Interface Units (FIUs) 16 and 18, and a digital transmission channel 20 for connecting the two FIUs 16 and 18. The FIUs 16 and 18 include signal detector units 16A and 18A, respectively. The FIUs 16 and 18 also include CPUs 16B and 18B, respectively. The signal detectors 16A serves to detect an incoming signal from facsimile machine 12, signal detector 18A serves to identify line state data, and CPUs 16B and 18B serve to assemble/disassemble the identified data into a digital packet.

For example, if facsimile machine 12 is transmitting facsimile messages, then FIU 16 serves to intercept and demodulate the facsimile signals from facsimile machine 12 and, once demodulated, to transmit these signals in digital form over the digital baseband channel 20. In this example, FIU 16 would be defined as the demodulating Facsimile Interface Unit. At the other end of the digital link 20, the FIU 18 would be defined as the "modulating FIU" since it receives the digital baseband signals transmitted over digital link 20, and converts these digital signals into an analog voiceband format by selection of a suitable modulating method. For a facsimile message originating from the facsimile machine 14, FIU 18 would be the demodulating FIU, and FIU 16 would be the modulating FIU.

The first embodiment of the invention is based on the uniform availability of a user-data digital channel. This embodiment is applicable to any channel that is continuously available and is insensitive to any partitioning of the channel imposed by system constraints. However, to reduce any timing jitter that could arise because of channel partitioning, the system according to the first embodiment internally divides the user-data channel into an integral number of data-cells. The exact timing and duration of the data cells is not important provided that a new data-cell becomes available frequently (e.g., at least every 3.333 ms). Table 1 below, lists, for example, the number of bits in each data-cell for various digital channel rates (assuming a 3.333 ms data-cell boundary timing).

TABLE 1

Data-cell Structure for Various
User Data Channel Rates

| Data Channel Rate (kbit/s) | Data-cell Width (bits) |
|---|---|
| 14.4 | 48 |
| 12.0 | 40 |
| 9.60 | 32 |
| 7.20 | 24 |
| 4.80 | 16 |
| 2.40 | 8 |

FIG. 2 shows an example of a 2.4 kbit/s baseband digital channel internally sub-divided into fields and sub-fields so that facsimile user data transmission is conveyed on a burst-mode basis. In FIG. 2, each of the 8-bit data cells is available every 3.33 ms, thereby providing the 2.4 kbit/s baseband channel (i.e., 8 bits/3.33 ms=2.4 kbits/s). Real-time transmission of group 3 facsimile cannot be supported at rates below 2.4 kbit/s.

According to the first embodiment, line control packets are generated whenever a line state transition occurs, and are transmitted in-band over the digital channel. Because these packets are transmitted in-band over the digital channel, they are generated by the demodulating FIU, and detected and removed by the modulating FIU. In this manner the use of the line control packets does not impact the overall end-to-end timing of the facsimile protocols. The line control packets always precede the transmission of user information which is associated with the new line state.

The actual line control packets include a predetermined number of data cells wherein the first one-third of these data cells contains a unique word which is unlikely to appear in any of the user's data. For example, the unique word may be an all binary ones sequence if such a sequence would unlikely appear in the user's data. This first one-third of the line control packet serves as a "preamble" to indicate that the remaining two-thirds of the line control data cells include an integral number of repetitions of an appropriate code for the new line state. Table 2 below lists examples of line-state code words with minimal redundancy. The codes listed in Table 2 are indicative of eight line states (three bits) and a fourth odd-parity bit is appended to each code for additional transmission error protection.

TABLE 2

| Coding of Line Control Field | |
| --- | --- |
| Code | Line State |
| 0001 | Idle |
| 0010 | CED Connection |
| 0100 | LES Response Advise |
| 0111 | Binary Coded Signal Connection |
| 1000 | Telephone Signalling Tones |
| 1011 | Synchronizing Signal Connection |
| 1101 | Preamble Connection |
| 1110 | Message Connection |

Figure 3:
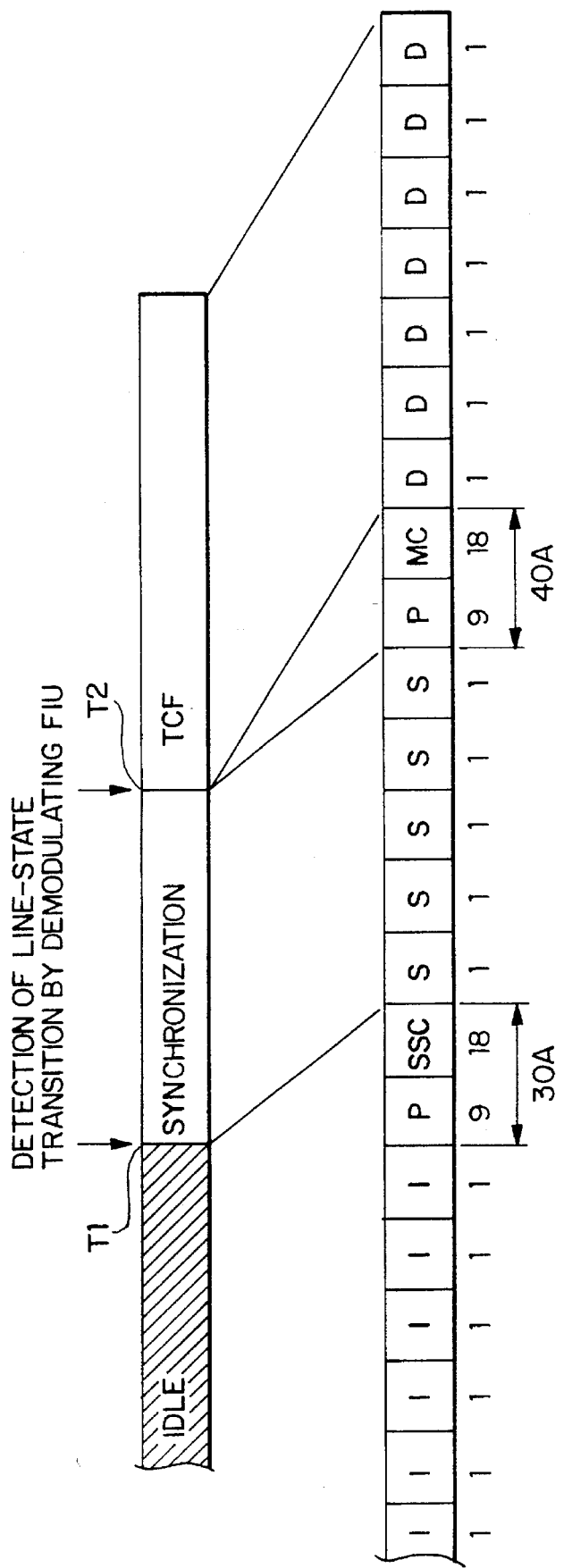
FIG. 3 shows an example of a line control packet in a data channel according to the first embodiment of the invention.

FIG. 3 shows an example how the packet LS approach can be used over the channel shown in FIG. 2. In this example, the line control packet includes twenty-seven data-cells; nine data-cells for the line control preamble (all binary "ones" sequence) and eighteen data-cells for the repetitive transmission of parity coded LS codes. The example of FIG. 3 will now be described in conjunction with the operation of the demodulating FIU 16 of FIG. 1.

Initially, idle line state information I is being transmitted over the digital channel. The signal detector 16A then detects a line state transition at time T1. Specifically, signal detector 16A detects, at time T1, a transition from an idle line state to a synchronization line state. Upon this detection, CPU 16B assembles a digital line control packet 30A including line control packet preamble P and the synchronizing signal connection line transition code SSC. As shown in FIG. 3, preamble P consists of nine data cells each of which contains a sequence of all binary ones or some other unlikely data sequence, and the transition code SSC includes of eighteen data cells containing the repetitive parity coded LS codes (i.e., 1011 as indicated in Table 2). Subsequently, synchronizing data S is transmitted over the digital channel.

The synchronizing data S continues to be sent over the digital channel until time T2 at which time the signal detector 16A detects another line state transition, this time to TCF (training check). Upon this detection, CPU 16B assembles line control packet 40A containing preamble P and the line transition code for message connection line coding (MC) which in Table 2 corresponds to code 1110. After line control packet 40 is transmitted over the digital link, data D representing the TCF pattern is transmitted.

Figure 4:
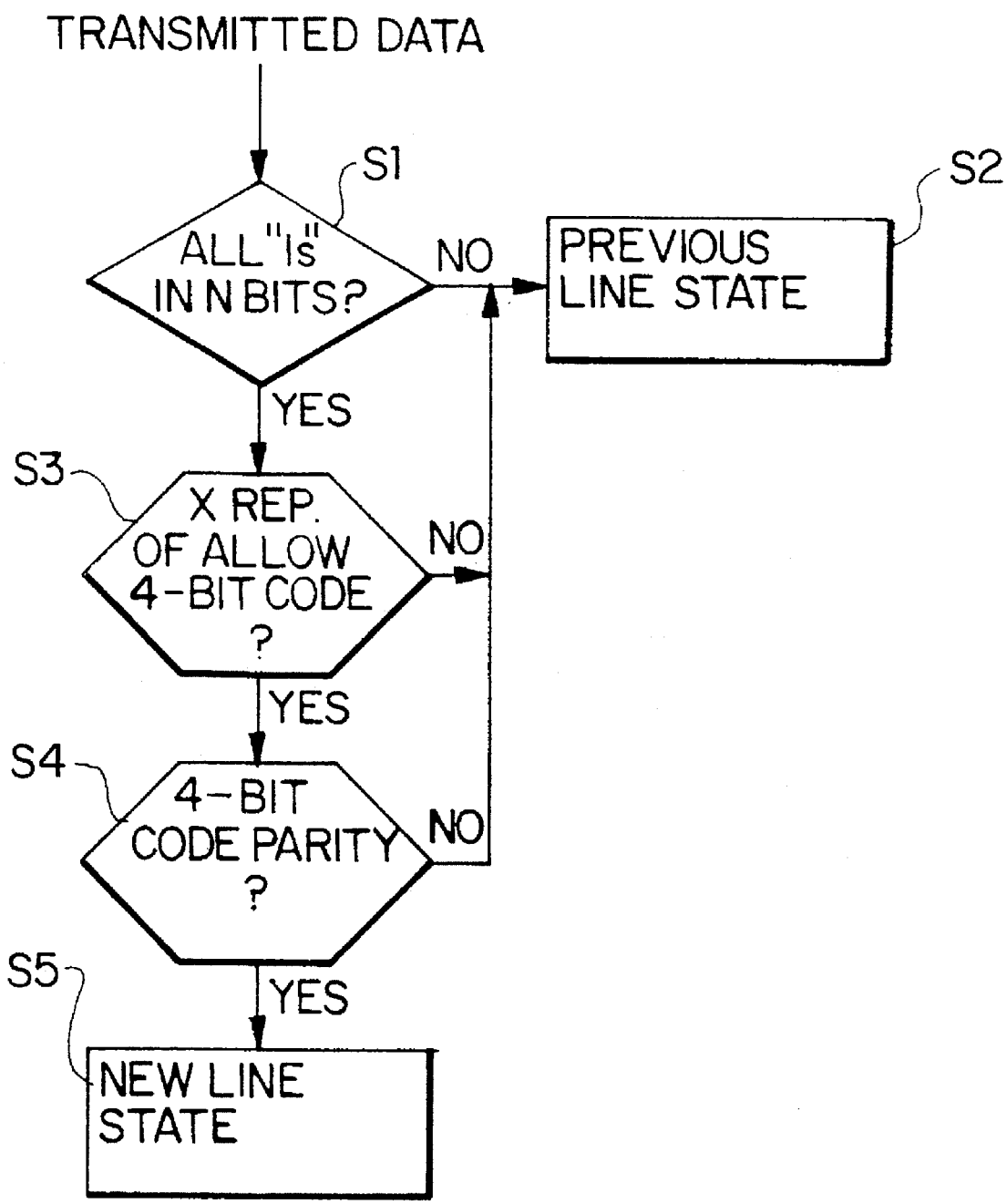
FIG. 4 is a flow chart depicting how the line control packet is detected according to the invention.

FIG. 4 details the operation of the modulating FIU 18 for determining whether information transmitted over the digital link 20 is information associated with the previous line state or information representing a new line state. As shown in FIG. 4, the modulating FIU 18 first determines in step S1 whether or not an all "1s" sequence is present in N consecutive bits. If the answer in step S1 is NO, then the information being sent over the digital link 20 is considered to be associated with the previous line state (step S2). If the answer in step S1 is YES, then the operation proceeds to step S3 where it is determined whether or not there are X repetitions of an allowable 4-bit code. If the answer in step S3 is NO, then the operation proceeds to step S2, i.e., the information being transmitted is considered data. If the answer in step S3 is YES, then a determination is made in step S4 as to whether or not the 4-bit code has the correct parity. If it is determined that the code does not have the correct parity (i.e., NO in step S4), then the operation proceeds to step S2 and the transmitted information is considered to be associated with the previous line state. However, if the answer in step S4 is YES, then the operation proceeds to step S5 and the transmitted information is considered to represent a new line state.

In order for the process to tolerate a relatively small number of digital link errors, the operation of the modulating FIU may be such that not all expected bits need to be correct to satisfy the queries in steps S1, S3 and S4. For example, in step S1, a "YES" answer could be derived even if only 90% of the expected "1s" are present.

After step S5, the modulating FIU 18 selects the suitable modulating operation for the line state determined from the 4-bit code. This can be implemented by, for example, a conventional look-up table which is addressable by the detected 4-bit code. The demodulating FIU 16 would also include a look-up table which is addressable by the detected data. For example, 4-bit code 0001 which represents an idle line state would be addressed by data detected to be an idle signal.

The second embodiment of the invention relaxes the requirement that transmission capacity is always uniformly available (either on a continuous or on a burst-mode basis) for facsimile user data. This embodiment recognizes the fact that some channel capacity within the digital channel may be pre-allocated on an intermittent basis for other system functions (e.g., plesiochronous control using stuff/destuff techniques) and thus the insertion of new user-data may not be possible at the frequency required to avoid unacceptable timing jitter at the receiving Facsimile Terminal Equipment (FTE).

In this case, it is still possible to internally partition the data channel into data-cells cognizant of the fact that their boundaries (and capacity) may in fact not always be available for aligning new user information for transmission over the digital channel. The second embodiment uses a triple type packet approach to identify the data-cell boundary that was closest to the detected transition of user data line-state (even though the packet was not inserted over the digital channel as soon as it became available).

Similar to the first embodiment, line control packets are generated or assembled in the second embodiment by the FIU whenever a line state transition is detected, and always precede the transmission of information (associated with the new line state) over the digital channel until the generation of a new line-control packet. Because these packets are transmitted in-band over the digital channel, the packets are generated by the demodulating FIU and removed by the modulating FIU.

Figure 5:
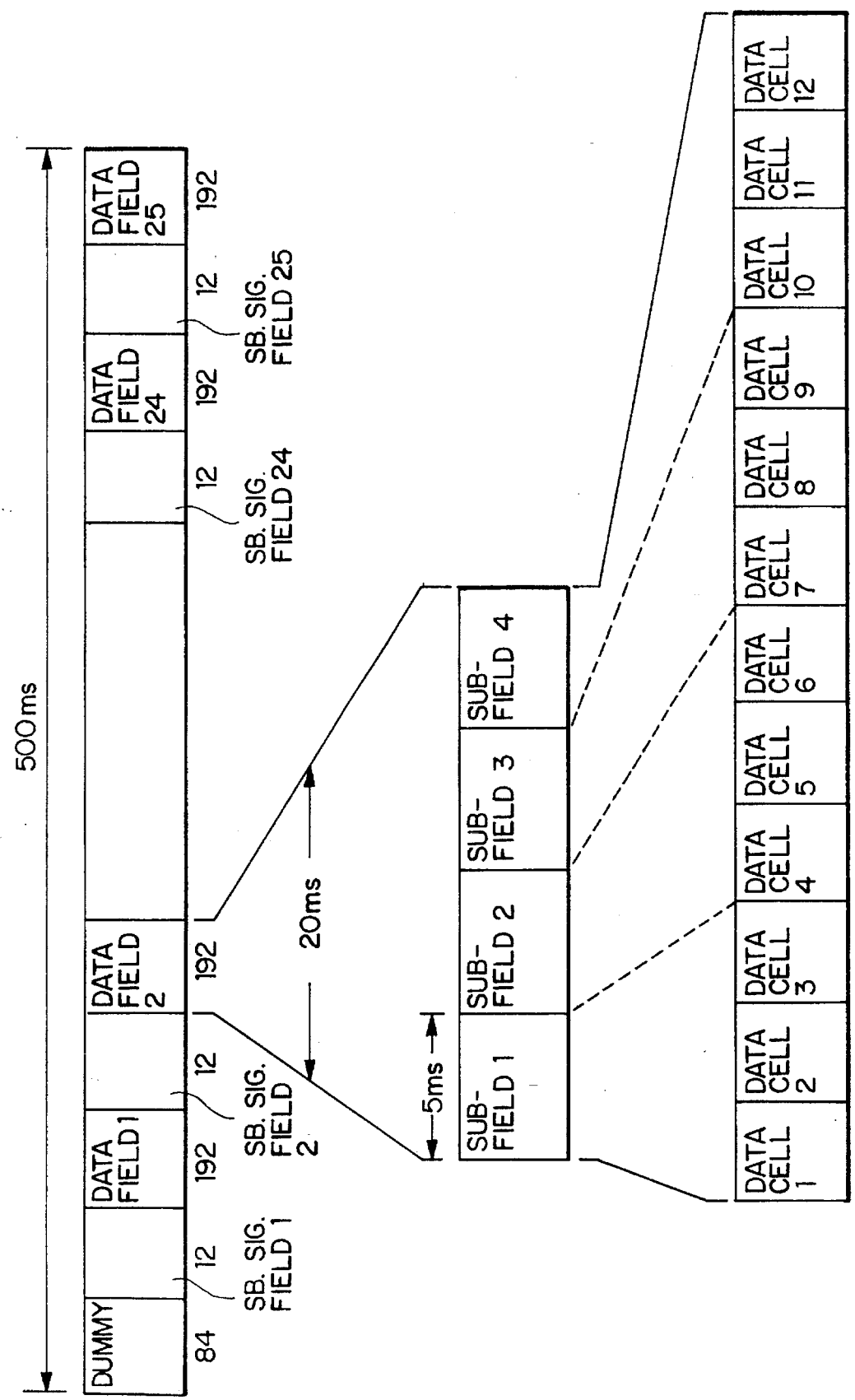
FIG. 5 is an example of a baseband digital channel according to a second embodiment of the invention.

FIG. 5 shows an example of a 9.6 kbit/s digital baseband channel according to the second embodiment. In FIG. 5, the channel is available for user data, however, on an intermittent basis sub-field 4 may not be available for user data except for a line control that has been generated and is ready for insertion in the data channel. Because of this constraint, the line control packets (which are transmitted at the highest supportable user-data signalling rate) must start at data-field boundaries (which in the example of FIG. 5 occur every 20 ms) and are constructed by utilization of three distinct parts (e.g., three data-fields).

The first part of the line control packet (i.e., the first data-field) is comprised of a unique word that is unlikely to occur within valid user data (e.g., all binary "ones" sequence) and is used as a line control preamble to indicate that the following two parts of the packet contain line state transition and data-cell positioning information. The second part of the packet (e.g., also one data field) is comprised of repetitions of the appropriate code (e.g., those listed in Table 2) for the new line state. In the example shown in FIG. 5, forty-eight repetitions of the line state are used. Thus, the first and second parts of the LS packet structure are similar to the first embodiment described above.

However, the third part of the packet which is also one data-field is constructed quite differently. Specifically, the third part of the packet accounts for the fact that the line control packets can not always be generated and inserted into the digital channel until after the line state transition has occurred and only when digital capacity becomes available (e.g., at the data-field boundary).

To overcome this non-uniform positioning of the line control packet, each of the data fields is divided into, for example, twelve higher resolution data-cells (i.e., 1.67 ms blocks of data; 20 ms/12=1.67 ms). Unlike the first embodiment, these data-cells are not to be used to align and carry new user or LS information. Rather, these data cells are used as a "time ruler" so that information received over the digital channel can be precisely referenced and positioned in terms of these data-cells at the modulating FIU end.

The third part of the line control packet contains a location code which identifies the data-cell (or the position) that was closest to the time instant when the line state transition was detected by the demodulating FIU. This data-cell is normally associated with the digital capacity portion (in this case the data-fields) transmitted immediately before the line control packet was inserted into the digital channel. In the example of FIG. 5, the last line control data-field could be comprised of forty-eight repetitions of a 4-bit location code such as those listed in Table 3 below:

TABLE 3

Data-cell Positioning in Data Field Preceding Line Control Packet

| Location Code | Bit in 192-bit Data Field | Bit in Sub-Field | Sub-Field Number |
|---|---|---|---|
| 0000 | 0 | 0 | 1 |
| 0001 | 16 | 16 | 1 |
| 0010 | 32 | 32 | 1 |

TABLE 3-continued

Data-cell Positioning in Data Field Preceding Line Control Packet

| Location Code | Bit in 192-bit Data Field | Bit in Sub-Field | Sub-Field Number |
|---|---|---|---|
| 0011 | 48 | 0 | 2 |
| 0100 | 64 | 16 | 2 |
| 0101 | 80 | 32 | 2 |
| 0110 | 96 | 0 | 3 |
| 0111 | 112 | 16 | 3 |
| 1000 | 128 | 32 | 3 |
| 1001 | 144 | 0 | 4 |
| 1010 | 160 | 16 | 4 |
| 1011 | 176 | 32 | 4 |
| 1100 | not used | not used | not used |
| 1101 | not used | not used | not used |
| 1110 | not used | not used | not used |
| 1111 | not used | not used | not used |

The third part of the line control packet can thus be used by the modulating FIU to detect when the line control packet would have been sent, had channel capacity been immediately available when the line state transition was detected by the demodulating FIU. This permits positioning the onset of a new line state and user data with high temporal resolution (e.g., 1.67 ms), and can be used by the modulating FIU as the basis for making further delay adjustments, if necessary, before transmitting the user data to the customer FTE.

The process of line control generation according to the second embodiment will now be described with reference to FIG. 6 which illustrates the transmission of a line control packet for an LS transition from an idle to a synchronization state.

Figure 6:
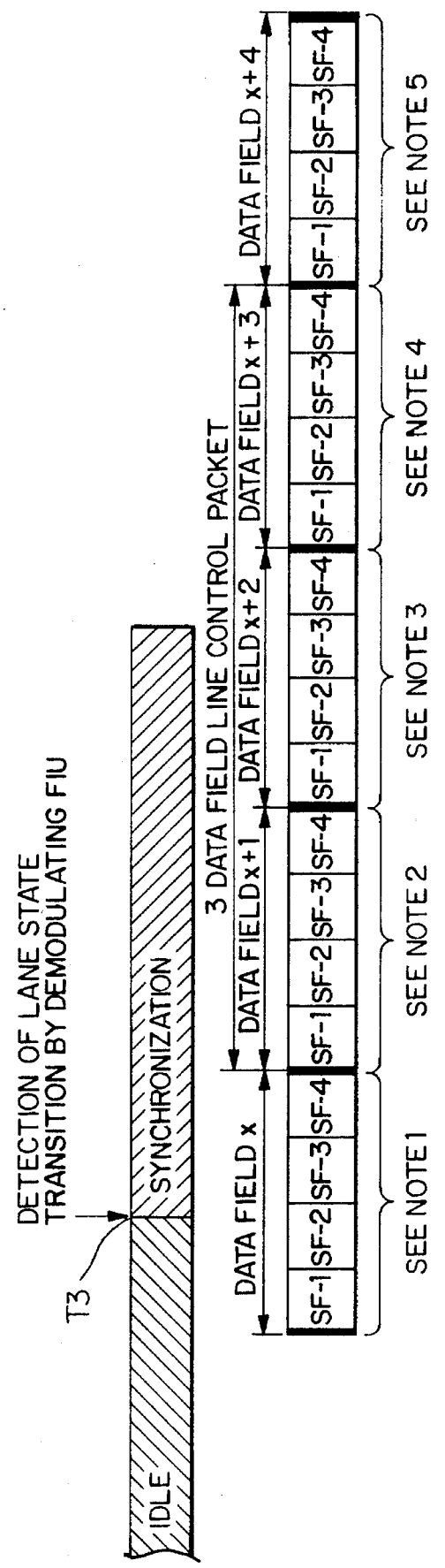
FIG. 6 shows an example of a line control packet in a data channel according to the second embodiment of the invention.

As shown in FIG. 6, a transition from line state "idle" to line state "synchronization" is detected by signal detector 16A of the demodulating FIU 16 (FIG. 1) at time T3. This transition detection occurred during data field x (which carries data representing an Idle state) at data cell 6 of subfield 2 (see FIG. 5). After detection of the line state transition, CPU 16B (FIG. 1) assembles the three data field line control packet, (i.e., data fields x+1, x+2 and x+3). Specifically, data field x+1 is the first data field of the three data field line control packet and carries an all binary ones sequence which serves as a preamble for the new line state. The data field x+2 is the second data field of the three data field line control packet and carries forty-eight repetitions of the Synchronizing Sequence Code 1011 (Table 2). The data field x+3 is the final data field of the three data field packet and carries forty-eight repetitions of position code 0100 since the synchronizing signal was detected during data cell 6 of sub-field 2 (Table 3). The data field x+4 carries a data sequence signalling the onset of synchronizing sequence.

As mentioned above, upon receiving the transmitted line state packet, the modulating FIU 18 can use the position code in the third data field to make delay adjustments so as to provide high temporal resolution between the onset of a new line state and user data. As shown in FIG. 7, the modulating FIU contains a buffer circuit 45 for receiving signals transmitted by the demodulating FIU, a variable delay circuit 50 connected to receive the output of the buffer circuit 45, and a decoder circuit 60 which decodes a received position code and which generates an adjustment signal corresponding to the position code in order to decrease the delay of the delay circuit 50. FIG. 8 shows an example of the operation of the circuit shown in FIG. 7.

As shown in FIG. 8A, signals S11 and S22 are to be transmitted over the digital link with a temporal separation of P1. Upon detection of signal S11, channel capacity was available, and therefore signal S11 was immediately transmitted. However, at the time that signal S22 was detected, channel capacity was not available. As a result, signal S22 was not immediately transmitted. Rather, signal S22 was transmitted when channel capacity is next available. As shown in FIG. 8B, signal S22 is actually transmitted at the next data field (at which time channel capacity was available), thereby causing the temporal separation of the transmitted signals S11 and S22 to be P2 which is greater than P1.

According to the second embodiment of the invention, the temporal separation of the transmitted signals S11 and S22 is corrected to approximate the original temporal separation. Specifically, upon detecting signal S22, the CPU of the demodulating FIU assembles a packet including a position code (Table 3) representing when signal S22 would have been sent, had channel capacity been available at the time signal S22 was first detected. The decoder circuit 60 (FIG. 7) of the modulating FIU translates this position code into a suitable adjustment signal X which is supplied to the adjustable delay circuit. FIG. 8C shows the results of the operation of the circuit shown in FIG. 7.

As shown in FIG. 8C, signal S11 is delayed by the delay circuit 50 for one complete data field (e.g., 20 ms) since channel capacity was available upon the detection of this signal, i.e., signal S11 was immediately transmitted. In this case, adjustment signal X would be equal to zero. However, signal S22 is delayed by less than one data field (20–X) by the delay circuit 50. Specifically, delay circuit 50 delays signal S22 in accordance with the adjustment signal X which is generated by decoder circuit 60 in accordance with the position code associated with signal S22. As a result, the original temporal separation P1 between signals S11 and S22 is maintained at the modulating FIU.

Having described and illustrated the present invention with preferred embodiments, it will be apparent to those skilled in the art that the invention may be modified in arrangement and detail without departing from the scope and spirit of the invention.

What is claimed is:

1. A facsimile communication system for transmitting line state information comprising:
    a first facsimile device for providing an analog voiceband facsimile signal, said analog voiceband facsimile signal carrying line state information;
    a first processing circuit, connected to receive the analog voiceband facsimile signal from said first facsimile device for demodulating the received analog voiceband facsimile signal to obtain digital data, and for generating a predetermined digital code signal representing the line state information carried in the analog voiceband facsimile signal, and for transmitting the predetermined digital code signal and the digital data;
    a second processing circuit, connected to receive the transmitted digital code signal and said transmitted digital data from said first processing circuit, for providing, in response to the received digital code and digital data an analog voiceband facsimile signal corresponding to said analog voiceband facsimile signal provided by said first facsimile device; and
    a second facsimile device, connected to receive the analog voiceband facsimile signal from the second processing circuit.

2. The facsimile communication system as defined in claim 1, wherein said digital code signal includes control bits which are not associated with a facsimile signal and control bits which represent the analog voiceband facsimile signal.

3. The facsimile communication system as defined in claim 1, wherein the the control bits which are not associated with a facsimile signal contains an all binary ones sequence.

4. The facsimile communication system as defined in claim 1, wherein said first processing circuit transmits baseband data signals after transmitting said digital code signal.

5. The facsimile communication system as defined in claim 4, wherein said first processing circuit transmits the digital code signal at the same rate as said subsequently transmitted baseband data.

6. The facsimile communication system as defined in claim 1, wherein said digital code signal includes a first code which is repeated in said digital code signal an integral number of times.

7. The facsimile communication system as defined in claim 6, wherein the first code is a four-bit code which includes a parity bit.

8. The facsimile communication system as defined in claim 1, wherein said first processing circuit assembles, in real-time, the digital code signal upon receiving the analog voiceband signal.

9. The facsimile communication system as defined in claim 1, wherein the digital code signal includes control bits representing a position within a data field.

10. The facsimile communication system as defined in claim 9, wherein said second processing circuit includes a variable delay means for delaying a received signal in accordance with the the control bits representing the position within the data field.

11. The facsimile communication system as defined in claim 10, wherein said second processing circuit includes a decoder circuit for decoding the control bits representing the position within the data field.

12. The facsimile communication system as defined in claim 9, wherein said digital code signal further includes control bits which are not associated with a facsimile signal.

13. The facsimile communication system as defined in claim 12, wherein the control bits which are not associated with a facsimile signal contains an all binary ones sequence.

14. The facsimile communication system as defined in claim 9, wherein said first processing circuit transmits baseband data signals after transmitting said digital code signal.

15. The facsimile communication system as defined in claim 4, wherein said digital code signal is transmitted by said first processing circuit at the same rate as said subsequently transmitted baseband data.

16. The facsimile communication system as defined in claim 9, wherein the control bits which represent the position within a data field is one data field in length.

17. The facsimile communication system as defined in claim 16, wherein the control bits which represent the position within a data field includes an integral number of repetitions.

18. The facsimile communication system as defined in claim 10, wherein a maximum delay of said variable delay means is one data field in length.

19. A method for transmitting line state information in a facsimile communication system comprising the steps of:

providing a first analog voiceband facsimile signal which carries line state information;

demodulating the first analog voiceband facsimile signal to provide digital data, and generating a predetermined digital code signal representing the line state information carried in the first analog voiceband signal;

transmitting the predetermined digital code signal and said digital data;

receiving the transmitted digital code signal and said transmitted digital data, and providing in response to the received digital code signal and digital data, a second analog voiceband facsimile signal corresponding to the first analog voiceband facsimile signal.

20. The method as defined in claim 19, wherein the transmitted digital code signal includes a first code which is repeated in said digital code signal an integral number of times, and a second code representing a position within a data field when the analog voiceband signal is provided.

21. A method for transmitting line state information and digital data in a facsimile communication system comprising the steps of:

providing an analog voiceband facsimile signal which carries line state information;

demodulating the analog voiceband facsimile signal so as to provide digital data;

generating a predetermined digital code which represents the line state information carried in the analog voiceband facsimile signal; and transmitting the predetermined digital code signal and the digital data.

22. A facsimile communication system for transmitting line state information comprising:

a facsimile device for providing an analog voiceband facsimile signal, said analog voiceband facsimile signal carrying line state information; and a processing circuit, connected to receive the analog voiceband facsimile signal from said facsimile device for demodulating the received analog voiceband facsimile signal to provide digital data, and for generating a predetermined digital code signal representing the line state information carried in the analog voiceband facsimile signal, and for transmitting the predetermined digital code signal and the digital data.

* * * * *